(12) United States Patent
Kim et al.

(10) Patent No.: US 10,914,555 B2
(45) Date of Patent: Feb. 9, 2021

(54) ACTIVE CAMOUFLAGE DEVICE

(71) Applicant: Electronics and Telecommunications Research Institute, Daejeon (KR)

(72) Inventors: Tae-Youb Kim, Daejeon (KR); Juhee Song, Daejeon (KR); Chil Seong Ah, Daejeon (KR); Seong-Mok Cho, Daejeon (KR); Sujung Kim, Daejeon (KR); Joo Yeon Kim, Daejeon (KR); Hojun Ryu, Seoul (KR); Jeong Ik Lee, Daejeon (KR); Sang Hoon Cheon, Daejeon (KR); Chi-Sun Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 186 days.

(21) Appl. No.: 15/949,172

(22) Filed: Apr. 10, 2018

(65) Prior Publication Data
US 2018/0335281 A1 Nov. 22, 2018

(30) Foreign Application Priority Data

May 19, 2017 (KR) .................. 10-2017-0062576
Oct. 18, 2017 (KR) .................. 10-2017-0135446

(51) Int. Cl.
*F41H 3/00* (2006.01)
*G02F 1/155* (2006.01)
(Continued)

(52) U.S. Cl.
CPC ............ *F41H 3/00* (2013.01); *G02F 1/13318* (2013.01); *G02F 1/155* (2013.01); *G02F 1/157* (2013.01);
(Continued)

(58) Field of Classification Search
CPC ........ G02F 1/155; G02F 1/153; G02F 1/1533; G02F 1/157; G02F 1/1523; G02F 1/1525; G02F 1/1521; G02F 1/163; G02F 1/133; G02F 1/13318; G02F 1/15; G02F 1/07; G02F 2203/11; G02F 2203/02;
(Continued)

(56) References Cited

U.S. PATENT DOCUMENTS 5,923,456 A 7/1999 Tench et al.
6,678,083 B1 * 1/2004 Anstee .................. B60R 1/088
359/265

(Continued)

FOREIGN PATENT DOCUMENTS

| KR | 10-2001-0086115 A | 9/2001 |
| KR | 10-1598025 B1 | 3/2016 |
| KR | 10-2016-0064338 A | 6/2016 |

OTHER PUBLICATIONS

K. Sauvet et al., "Electrochromic properties of WO as a single layer and in a full device: From the visible to the infrared", Journal of Physics and Chemistry of Solids, 2010, 71 (4).

*Primary Examiner* — Jie Lei
(74) *Attorney, Agent, or Firm* — Rabin & Berdo, P.C.

(57) ABSTRACT

Provided is an active camouflage device including a reflective layer, a first electrode disposed on the reflective layer, a second electrode facing the first electrode, and an electrolyte provided between the first and second electrodes. The first electrode includes a transparent electrode, and the second electrode includes a metal mesh.

13 Claims, 9 Drawing Sheets

(51) Int. Cl.
  *G02F 1/157* (2006.01)
  *G02F 1/163* (2006.01)
  *G02F 1/133* (2006.01)
  *F41H 3/02* (2006.01)

(52) U.S. Cl.
  CPC ............... *F41H 3/02* (2013.01); *G02F 1/163* (2013.01); *G02F 2203/02* (2013.01); *G02F 2203/11* (2013.01)

(58) Field of Classification Search
  CPC .... G09G 3/3648; G09G 3/367; G09G 3/3688; G02B 26/00; F41H 3/00; F41H 3/02; B60R 1/088
  USPC ............... 359/265–275, 242, 245, 296, 609; 345/89–103, 105; 349/16
  See application file for complete search history.

(56) References Cited

U.S. PATENT DOCUMENTS

| | | | |
|---|---|---|---|
| 9,651,844 B2 | 5/2017 | Kim et al. | |
| 2011/0069974 A1 | 3/2011 | Kim et al. | |
| 2011/0181939 A1* | 7/2011 | Bressand | B32B 17/10036 359/270 |
| 2013/0271812 A1* | 10/2013 | Brown | E06B 9/24 359/275 |
| 2016/0161637 A1* | 6/2016 | Yen | H05K 1/097 359/885 |
| 2016/0223878 A1* | 8/2016 | Tran | G02F 1/155 |
| 2017/0099103 A1 | 4/2017 | Jang et al. | |

\* cited by examiner

ACTIVE CAMOUFLAGE DEVICE

CROSS-REFERENCE TO RELATED APPLICATIONS

This U.S. non-provisional patent application claims priority under 35 U.S.C. § 119 of Korean Patent Application Nos. 10-2017-0062576, filed on May 19, 2017, and 10-2017-0135446, filed on Oct. 18, 2017, the entire contents of which are hereby incorporated by reference.

BACKGROUND

The present disclosure herein relates to an active camouflage device.

Various types of camouflage devices have been researched. In general, the camouflage device may independently correspond to each of a radar detector, an infrared detector, and a visible ray detector. As the detector has been developed, the camouflage device capable of corresponding to two or more kinds of detectors at the same time in a complex manner is demanded.

The camouflage device is used for camouflage military clothing, a camouflage helmet, and a portable weapon. For example, a SAAB BARRACUDA company in U.S.A has developed Ultra Lightweight Camouflage Net System (UL-CANS), and an ELTICS company has developed Black Fox.

SUMMARY

The present disclosure provides an active camouflage device providing a camouflage mode for an electromagnetic wave in an infrared ray region, a visible ray region, and an electric wave region.

The present disclosure also provides an active camouflage device changing an operation mode in correspondence to an infrared ray and a visible ray emitted from a surrounding environment.

However, the present disclosure may not be limited to the embodiments described above but be embodied in various other ways.

An embodiment of the inventive concept provides an active camouflage device including: a reflective layer; a first electrode disposed on the reflective layer; a second electrode facing the first electrode; and an electrolyte provided between the first and second electrodes. The first electrode includes a transparent electrode, and the second electrode includes a metal mesh.

In an exemplary embodiment, the active camouflage device may further include a semi-transparent layer provided between the first electrode and the electrolyte. The semi-transparent layer may reflect a portion of a visible ray incident into the semi-transparent layer and allow another portion of the visible ray to pass therethrough.

In an exemplary embodiment, the semi-transparent layer may contain gold (Au), silver (Ag), platinum (Pt), aluminum (Al), or a combination thereof.

In an exemplary embodiment, the active camouflage device may further include an electrochromic layer provided between the second electrode and the electrolyte. The electrochromic layer may be colored when reduced and transparent when oxidized.

In an exemplary embodiment, the electrochromic layer may contain tungsten trioxide ($WO_3$).

In an exemplary embodiment, the active camouflage device may further include a passivation electrode provided between the electrochromic layer and the second electrode.

In an exemplary embodiment, the passivation electrode may directly contact the electrolyte.

In an exemplary embodiment, the active camouflage device may further include: a first substrate provided at an opposite side of the first electrode with the reflective layer therebetween; and a second substrate provided at an opposite side of the electrochromic layer with the second electrode therebetween. Each of the first and second substrates may include a transparent substrate.

In an exemplary embodiment, each of the first and second substrates may contain Si, Ge, $CaF_2$, or $BaF_2$.

In an exemplary embodiment, the active camouflage device may further include a first substrate provided between the reflective layer and the first electrode; and a second substrate provided at an opposite side of the electrochromic layer with the second electrode therebetween. Each of the first and second substrates may include a transparent substrate.

In an exemplary embodiment, the electrolyte may contain at least one of silver (Ag) ions, bromine (Br) ions, lithium (Li) ions, and copper (Cu) ions.

In an exemplary embodiment, the second electrode may contain a metamaterial having a negative refractive index.

In an exemplary embodiment, the active camouflage device may further include: a control unit; and a detection unit. The detection unit may measure a wavelength of a visible ray and an intensity of an infrared ray of a surrounding of the active camouflage device to generate measurement data, and then send the measurement data to the control unit, and the control unit may control an operation mode of the active camouflage device on the basis of the measurement data received from the detection unit.

In an exemplary embodiment, the operation mode of the active camouflage device may include: a visible ray camouflage mode at which, as the control unit applies a lower voltage to the first electrode than that applied to the second electrode, a semi-transparent layer is formed on the first electrode, and the semi-transparent layer may reflect a portion of a visible ray incident into the semi-transparent layer and allow another portion of the visible ray to pass therethrough.

In an exemplary embodiment, the active camouflage device may further include an electrochromic layer provided between the second electrode and the electrolyte. The electrochromic layer may be colored when reduced and transparent when oxidized. The operation mode of the active camouflage device may include: an infrared ray camouflage mode at which, as the control unit applies a lower voltage to the second electrode than that applied to the first electrode, the electrochromic layer is colored. The colored electrochromic layer may absorb an infrared ray.

In an exemplary embodiment, the operation mode of the active camouflage device may always include an electric wave camouflage mode at which an electric wave incident into the active camouflage device is absorbed.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Exemplary embodiments of technical ideas of the inventive concept will be described with reference to the accompanying drawings so as to sufficiently understand constitutions and effects of the inventive concept. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

Like reference numerals refer to like elements throughout. The embodiment in the detailed description will be described with cross-sectional views and/or plan views as ideal exemplary views of the inventive concept. In the figures, the dimensions of regions are exaggerated for effective description of the technical contents. Areas exemplified in the drawings have general properties, and are used to illustrate a specific shape of a semiconductor package region. Thus, this should not be construed as limited to the scope of the present invention. It will be understood that although the terms first and second are used herein to describe various elements, these elements should not be limited by these terms. These terms are only used to distinguish one component from another component. Embodiments described and exemplified herein include complementary embodiments thereof.

In the following description, the technical terms are used only for explaining a specific exemplary embodiment while not limiting the inventive concept. In this specification, the terms of a singular form may include plural forms unless specifically mentioned. The meaning of 'comprises' and/or 'comprising' does not exclude other components besides a mentioned component.

Hereinafter, the present invention will be described in detail by explaining preferred embodiments of the invention with reference to the attached drawings.

Figure 1:
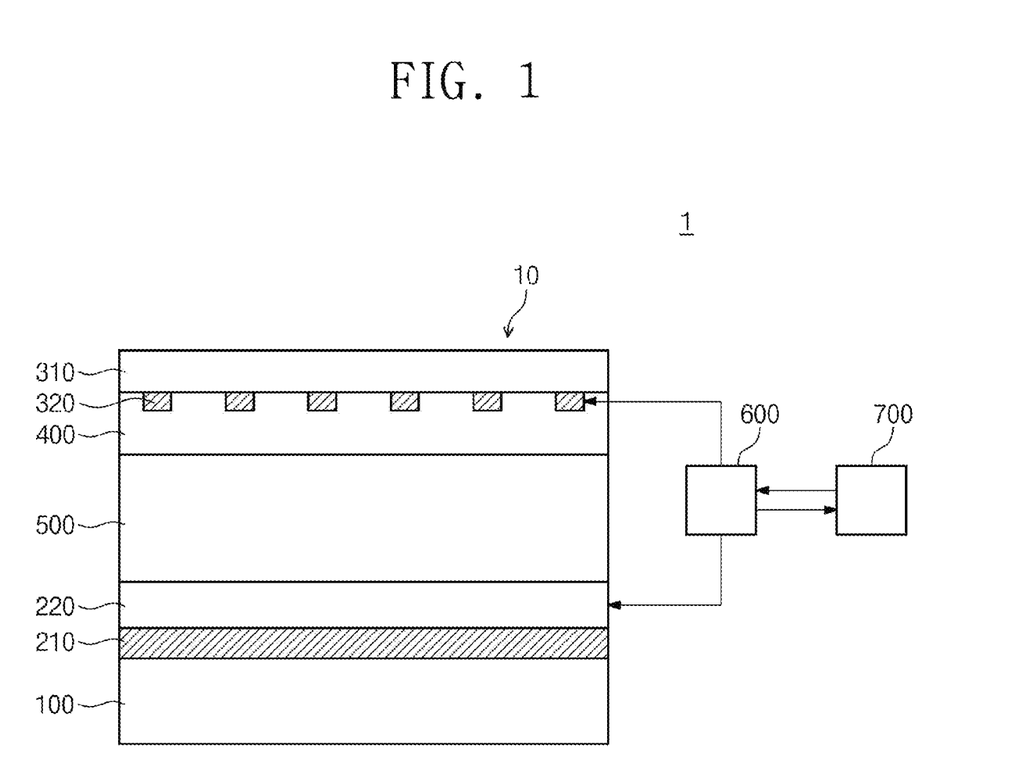
FIG. 1 is a cross-sectional view of an active camouflage element according to exemplary embodiments of the inventive concept.
Figure 2:
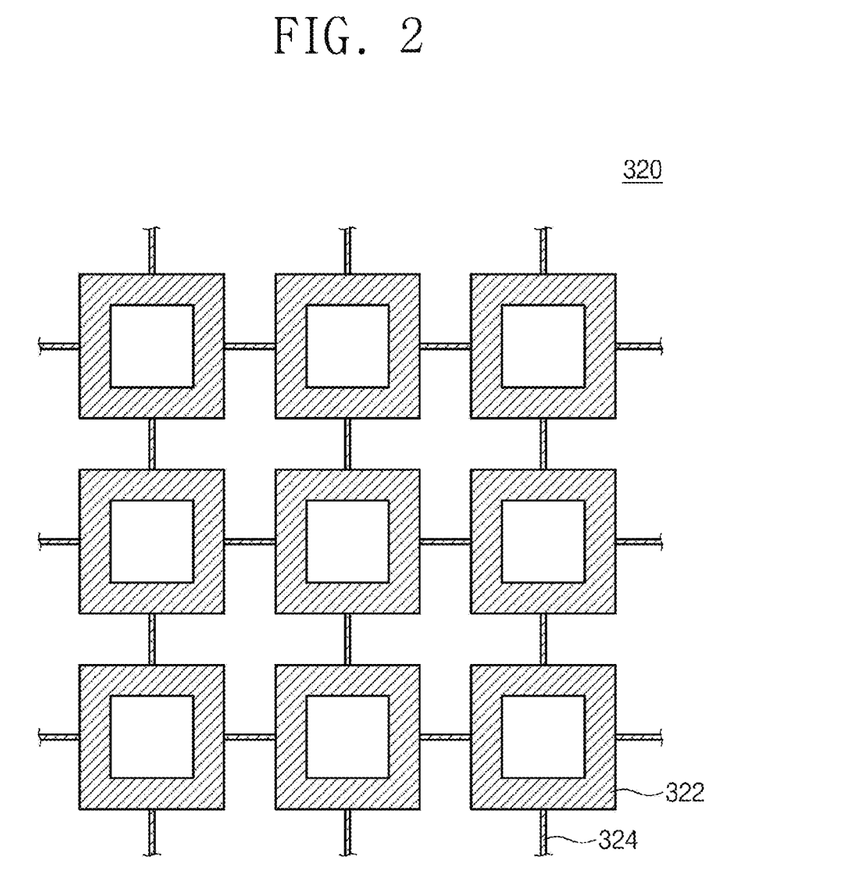
FIG. 2 is a plan view of a second electrode according to exemplary embodiments of the inventive concept.

FIG. 1 is a cross-sectional view of an active camouflage element according to exemplary embodiments of the inventive concept. FIG. 2 is a plan view of a second electrode according to exemplary embodiments of the inventive concept.

Referring to FIG. 1, an active camouflage device 1 including an active camouflage element 10, a control unit 600, and a detection unit 700 may be provided. The active camouflage element 10 may include a first substrate 100, a reflective layer 210, a first electrode 220, a second substrate 310, a second electrode 320, an electrochromic layer 400, and an electrolyte 500 provided between the electrochromic layer 400 and the first electrode 220. The first substrate 100 and the second substrate 310 may be transparent substrates. For example, the first and second substrates 100 and 310 may be a transparent glass substrate, a glass fiber substrate, or a plastic substrate. The plastic substrate may include at least one of, e.g., polyethylene, polyacrylate, polyethylene-ether phthalate, polyethylene naphthalate, polycarbonate, polyarylate, polyetherimide, polyethersulfone, and polyimide. In exemplary embodiments, the first and second substrates 100 and 310 may allow a visible ray, a near-infrared ray, and a mid-infrared ray to pass therethrough. For example, each of the first and second substrates 100 and 310 may include Si, Ge, $CaF_2$, or $BaF_2$.

The reflective layer 210 may reflect a ray or an electric wave incident into the reflective layer 210. The reflective layer 210 may include metal. For example, the reflective layer 210 may include gold (Au), silver (Ag), platinum (Pt), aluminum (Al), or a combination thereof.

The first electrode 220 may be a transparent electrode. For example, the first electrode 220 may be an indium tin oxide (ITO) electrode, a fluorine doped tin oxide (FTO) electrode, an Al-doped ZnO (AZO) electrode, a carbon nano tube (CNT) electrode, a silver nanowire electrode, a ZnO—$Ga_2O_3$ electrode, a $ZnOAl_2O_3$ electrode, a tin oxide electrode, an antimony tin oxide (ATO) electrode, a zinc oxide electrode, or a combination thereof.

The second electrode 320 may have a mesh shape. For example, the second electrode 320 may include a metal mesh. The second electrode 320 may include a material having a dielectric constant in which a real number is a negative number. For example, the second electrode 320 may include at least one selected from the group consisting of silver (Ag), aluminum (Al), gold (Au), and platinum (Pt).

Referring to FIG. 2, the second electrode 320 may include unit structures 322 of a metamaterial and conductive lines 324 electrically connecting the unit structures 322 of the metamaterial to each other. The unit structures 322 of the metamaterial may be arranged in a predetermined distance to constitute the metamaterial. The unit structures 322 of the metamaterial may be arranged to have a negative permeability, and accordingly, the metamaterial may have a negative refractive index. When an electric wave is incident into the active camouflage element 10, the electric wave may be scattered by the metamaterial. The shape and arrangement of the unit structures 322 of the metamaterial may not be limited to the illustration in FIG. 2 and may be determined according to a frequency of an electric wave that is scattered or absorbed through the active camouflage element 10. The unit structures 322 of the metamaterial and the conductive lines 324 may include the same material as each other or different materials from each other.

The electrochromic layer 400 may have a color varied according to an oxidation-reduction reaction. The electrochromic layer 400 is colored when reduced and transparent when oxidized. When the electrochromic layer 400 in a transparent state absorbs ions that will be described later (or, the electrochromic layer 400 is reduced), the electrochromic layer 400 may be colored, and when the colored electrochromic layer 400 releases the ions (or, the electrochromic layer 400 is oxidized), the electrochromic layer 400 may be transparent again. The colored electrochromic layer 400 may partially absorb infrared rays to decrease intensity of the infrared ray. For example, the electrochromic layer 400 may include: a metal oxide electrochromic material (e.g., a metal oxide including cobalt (Co), tungsten (W), iridium (Ir), nickel (Ni), vanadium (V), indium (In), cerium (Ce), manganese (Mn), niobium (Nb), rhodium (Rh), or ruthenium (Ru)); an organic electrochromic material (e.g., viologen, quinone, wurster blue, or perylene dimide); or a conductive polymer electrochromic material (e.g., a conductive polymer including polythiophene, polyaniline, polypyrrole, polyanthracene, polyfluorene, polycarbazole, polyphenylenevinylen, or derivatives thereof).

In exemplary embodiments, the electrochromic layer 400 may be tungsten trioxide ($WO_3$) layer. The electrolyte 500 may provide ions to the electrochromic layer 400 to induce the oxidation/reduction reaction of the electrochromic layer 400. The electrolyte 500 may include a liquid electrolyte, a solid electrolyte, or a gel-type electrolyte. For example, the electrolyte may include silver (Ag) ions, bromine (Br) ions, lithium (Li) ions, and copper (Cu) ions. The control unit 600 may apply voltages different from each other to the first electrode 220 and the second electrode 320. When the control unit 600 applies a higher voltage to the first electrode 220 than the second electrode 320, ions (e.g., lithium (Li) ions) in the electrolyte 500 may be absorbed into the electrochromic layer 400. Accordingly, the electrochromic layer 400 may be colored. When the control unit 600 applies a lower voltage to the first electrode 220 than the second electrode 320, the ions (e.g., lithium (Li) ions) in the electrochromic layer 400 may be released out of the electrochromic layer 400. Accordingly, the electrochromic layer 400 may be transparent. As the control unit 600 applies voltages different from each other to the first electrode 220 and the second electrode 320, a semi-transparent layer (not shown) may be generated or dissipated. The generation and dissipation of the semi-transparent layer will be described later.

The detection unit 700 may detect visible ray and infrared ray emitted from the surrounding environment of the active camouflage element 10. The detection unit 700 may transmit the detection data to the control unit 600. The control unit 600 may determine an operation mode of the active camouflage element 10 on the basis of the detection data.

The operation mode of the active camouflage element 10 may include an electric wave camouflage mode, a visible ray camouflage mode, and an infrared ray camouflage mode. The electric wave camouflage mode may allow the active camouflage element 10 to absorb an electric wave incident into the active camouflage element 10 without reflecting the same. The visible ray camouflage mode may allow the active camouflage element 10 to emit visible ray having a wavelength similar to that of the visible ray emitted from the surrounding environment. The infrared ray camouflage mode may allow the active camouflage element 10 to absorb the infrared ray emitted from the object to be camouflaged, and then emit infrared ray having an intensity similar to that of the infrared ray emitted from the surrounding environment. The electric wave camouflage mode may be always operated. The visible ray camouflage mode and the infrared ray camouflage mode may be selectively operated.

Figure 3:
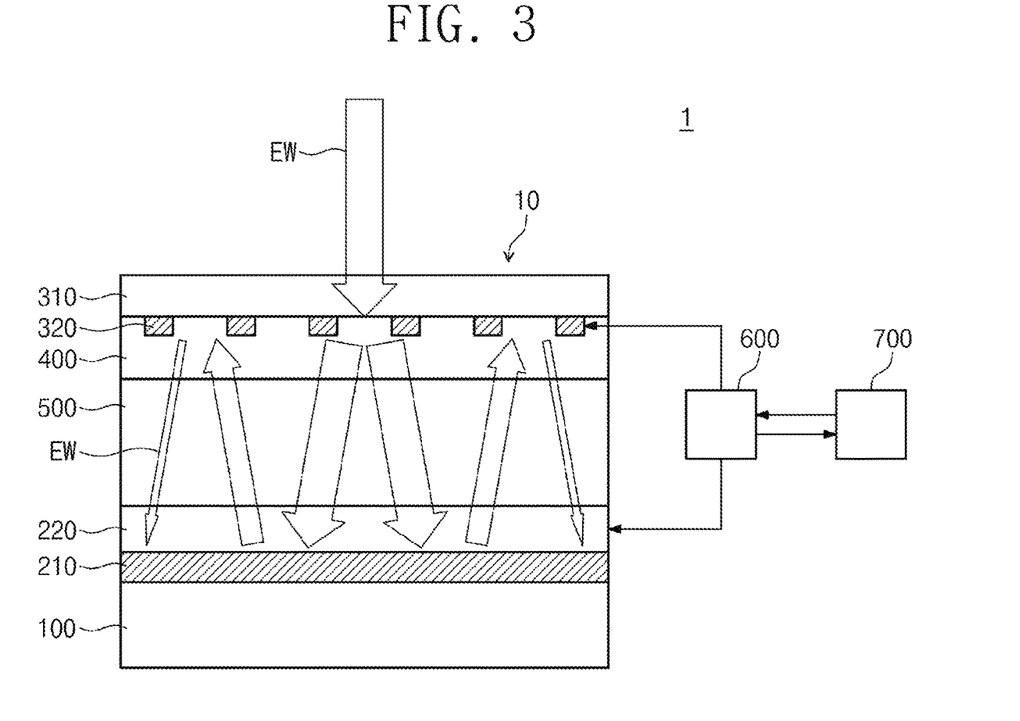
FIG. 3 is a cross-sectional view for explaining an electric wave camouflage mode of the active camouflage element according to exemplary embodiments of the inventive concept.

FIG. 3 is a cross-sectional view for explaining the electric wave camouflage mode of the active camouflage element according to exemplary embodiments of the inventive concept. For simplicity of description, description for contents that are substantially the same as those described with reference to FIGS. 1 and 2 will not be provided.

Referring to FIG. 3, the control unit 600 may not apply a voltage to the first electrode 220 and the second electrode 320. Accordingly, the electrochromic layer 400 may be transparent.

An electric wave EW may pass through the second substrate 310 and be incident into the active camouflage element 10. Since the second electrode 320 includes the metamaterial, the electric wave EW may be scattered by the second electrode 320. The scattered electric wave EW may be reflected by the reflective layer 210 to travel toward the second electrode 320 in the active camouflage element 10. The electric wave EW arrived at the second electrode 320 may be scattered to travel again toward the reflective layer 210. A process in which the electric wave EV is reflected by the reflective layer 210 and scattered by the second electrode 320 in the active camouflage element 10 may be repeated. In the above process, the electric wave EW may lose energy and be dissipated. That is, the electric wave incident into the active camouflage element 10 may be absorbed into and dissipated in the active camouflage element 10.

For convenience of description, a case in which the control unit 600 does not apply a voltage to the first and second electrodes 220 and 320 is described. The active camouflage element 10 may absorb the electric wave EW regardless of whether the voltage is applied to the first and second electrodes 220 and 320.

In general, a radar detects an object by using a method of detecting an electric wave reflected by the object. Since the active camouflage element 10 according to an embodiment of the inventive concept dissipates the electric wave incident into the active camouflage element 10 by absorbing the same, the active camouflage element 10 may not be detected by a radar.

Figure 4:
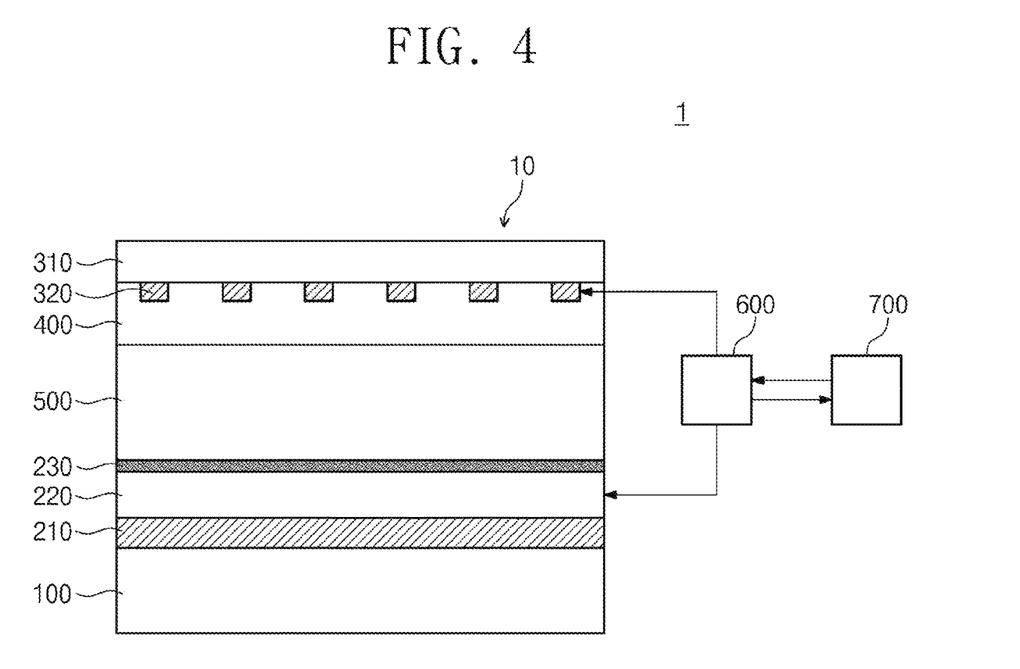
FIGS. 4 and 5 are cross-sectional views for explaining a visible ray camouflage mode of the active camouflage element according to exemplary embodiments of the inventive concept.
Figure 5:
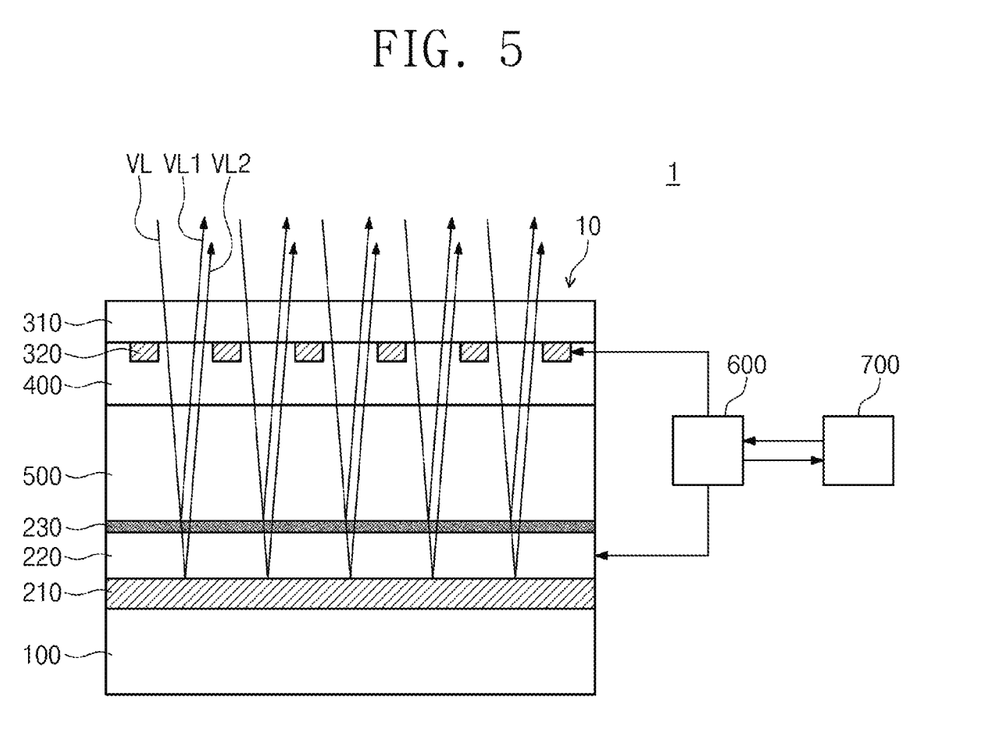
Figure 6:
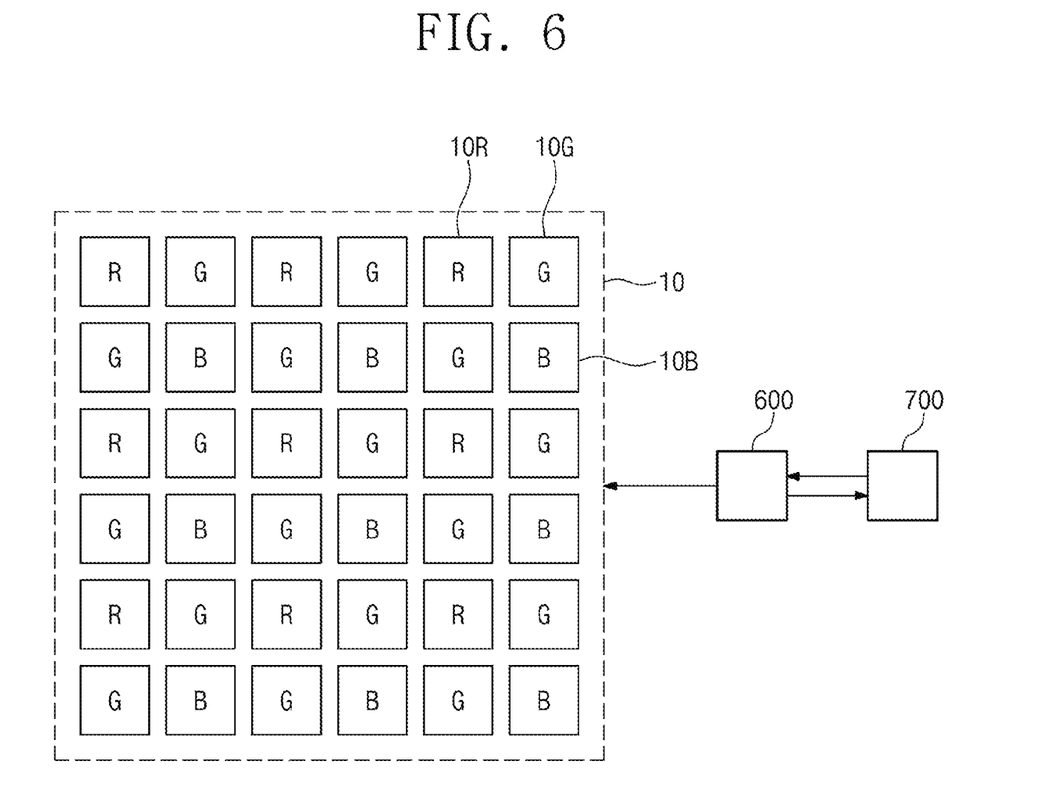
FIG. 6 is a conceptual view for explaining the visible ray camouflage mode of the active camouflage element according to exemplary embodiments of the inventive concept.

FIGS. 4 and 5 are cross-sectional views for explaining the visible ray camouflage mode of the active camouflage element according to exemplary embodiments of the inventive concept. FIG. 6 is a conceptual view for explaining the visible ray camouflage mode of the active camouflage element according to exemplary embodiments of the inventive concept. For concise description, description for contents that are substantially the same as those described with reference to FIGS. 1 and 3 will not be provided.

Referring to FIG. 4, as the control unit 600 applies a lower voltage to the first electrode 220 than that applied to the second electrode 320, a semi-transparent layer 230 may be formed on the first electrode 220, and the electrochromic layer 400 may be transparent. For example, the semi-transparent layer 230 may include silver (Ag). Hereinafter, a method for forming the semi-transparent layer 230 will be simply described.

When the control unit 600 applies a lower voltage to the first electrode 220 than that applied to the second electrode 320, an ion that is the most reducible among the ions in the electrolyte 500 may receive an electron from a surface of the first electrode 220. When the electrolyte 500 includes silver (Ag) ions, bromine (Br) ions, lithium (Li) ions, and copper (Cu) ions, since the silver (Ag) ions are the most reducible ions, the silver (Ag) ions may receive the electron from the first electrode 220. Accordingly, the semi-transparent layer 230 including the silver (Ag) may be formed on the surface of the first electrode 220.

Referring to FIG. 5, a visible ray VL may be incident into the active camouflage element 10 in FIG. 4. A first visible ray VL1 that is a portion of the visible ray VL may be reflected by the semi-transparent layer 230, and a second visible ray VL2 that is another portion of the visible ray VL may pass through the semi-transparent layer 230. The second visible ray VL2 may pass through the first electrode 220 and reflected by the reflective layer 210. The first visible ray VL1 and the second visible ray VL2 may have a path difference as many as two times of a thickness of the first electrode 220. When the path difference is integer times of a wavelength of the visible ray VL, the first visible ray VL1 and the second visible ray VL2 may be constructively interfered with each other. Accordingly, the visible ray emitted from the active camouflage element 10 may have the strongest intensity. When the path difference is integer times of a wavelength of the visible ray VL, the first visible ray VL1 and the second visible ray VL2 may be constructively interfered with each other. Accordingly, the visible ray emitted from the active camouflage element 10 may have the weakest intensity.

Referring to FIG. 6, the active camouflage element 10 may be provided in plurality. The plurality of active camouflage elements 10 may include a first active camouflage element 10R emitting a red color in a constructive interference manner, a second active camouflage element 10G emitting a green color in a constructive interference manner, and a third active camouflage element 10B emitting a blue color in a constructive interference manner.

The detection unit 700 may measure visible ray emitted from the surrounding environment of the active camouflage device 1 to transmit the measured value to the control unit 600. The control unit 600 may adjust a voltage applied to the first and second electrodes 220 and 320 of each of the active camouflage element 10 so that the active camouflage device 1 emits visible ray having a wavelength similar to that of the visible ray emitted from the surrounding of the active camouflage device 1. Here, the visible ray emitted from the active camouflage device 1 may be a combination of visible rays emitted from the active camouflage elements. That is, the visible ray emitted from the active camouflage device 1 may have a wavelength that is determined by a combination of a red visible ray, a green visible ray, and a blue visible ray, which are emitted from the first to third active camouflage elements 10R, 10G, and 10B, respectively.

According to an embodiment of the inventive concept, the active camouflage device 1 capable of actively changing a wavelength of the visible ray emitted in correspondence to the visible ray emitted from the surrounding environment.

Figure 7:
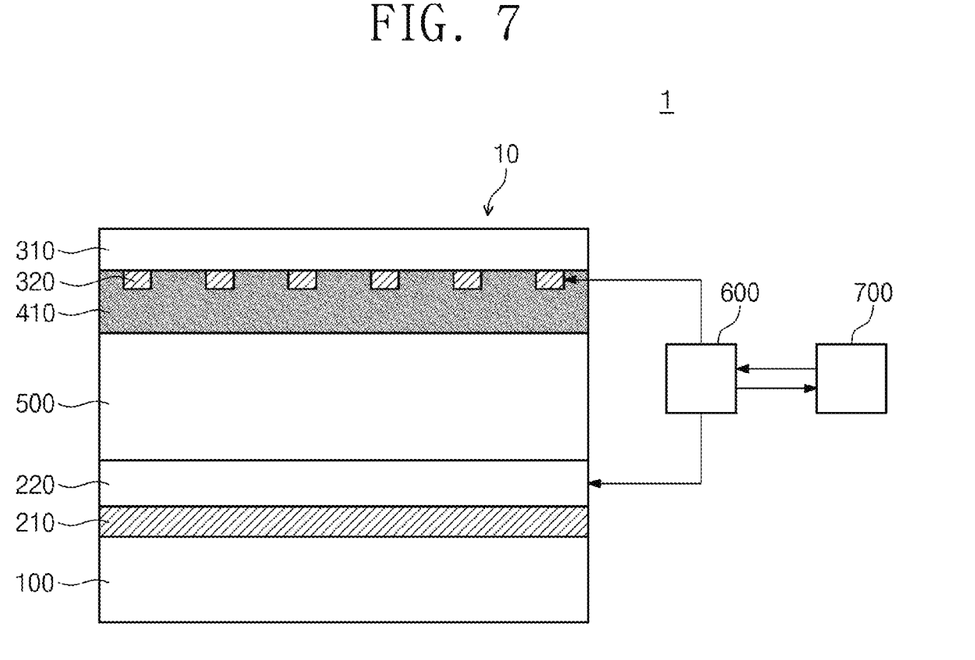
FIGS. 7 and 8 are cross-sectional views for explaining an infrared ray camouflage mode of the active camouflage element according to exemplary embodiments of the inventive concept.
Figure 8:
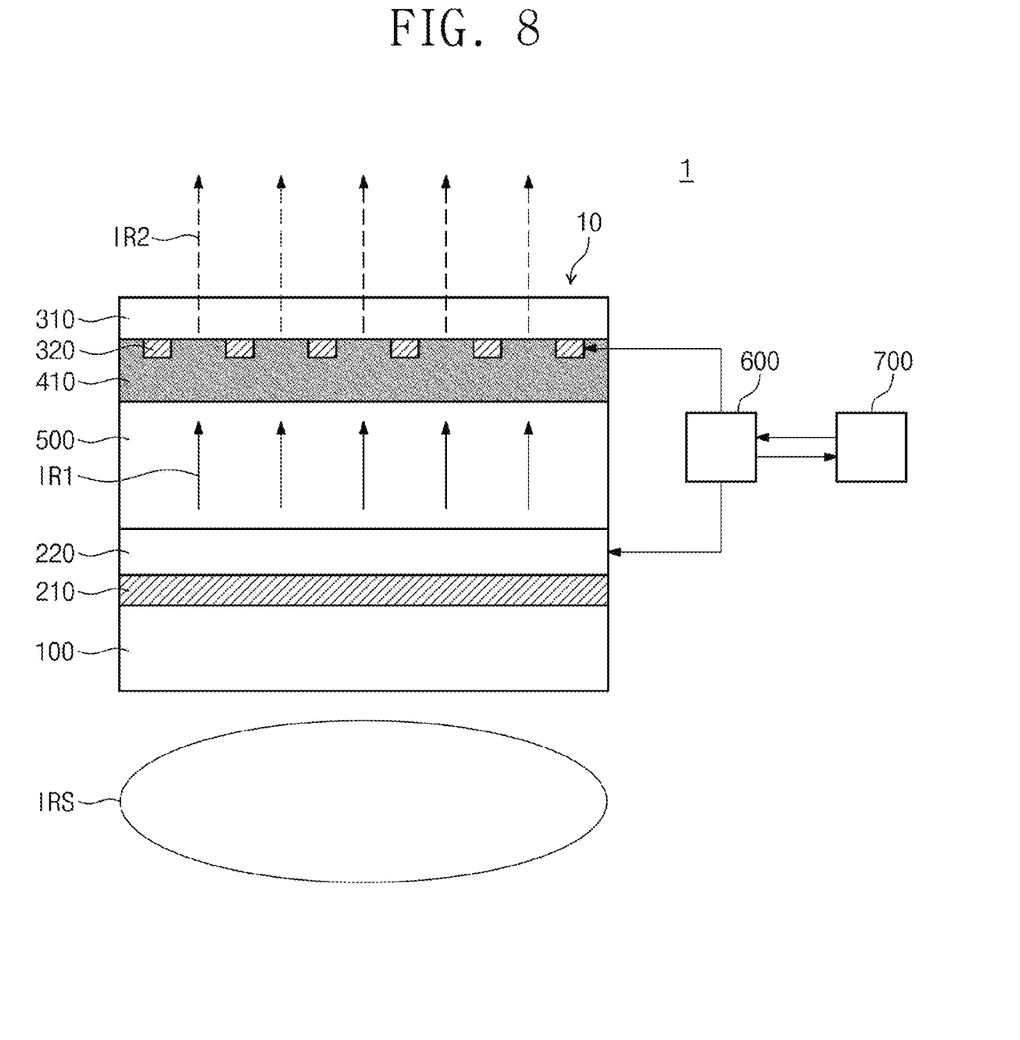

FIGS. 7 and 8 are cross-sectional views for explaining an infrared ray camouflage mode of the active camouflage element according to exemplary embodiments of the inventive concept. For concise description, the substantially same contents as those described with reference to FIGS. 1 to 3 will not be described.

Referring to FIG. 7, as the control unit 600 applies a lower voltage to the second electrode 320 than that applied to the first electrode 220, the electrochromic layer 400 may be colored, and the semi-transparent layer 230 (refer to FIG. 4) on the first electrode 220 may be removed. As described with reference to FIG. 1, the electrochromic layer 400 may be colored by absorbing the ions (e.g., lithium (Li) ions) in the electrolyte 500 and converted into a colored electrochromic layer 410. The colored electrochromic layer 410 may have a property absorbing an infrared ray. As an amount of ions that are absorbed by the electrochromic layer 400 increases, an amount of the infrared ray that is absorbed by the colored electrochromic layer 410 may increase. The amount of the ions that are absorbed by the colored electrochromic layer 410 may be proportional to a time at which a lower voltage is applied to the second electrode 320 than the first electrode 220.

Referring to FIG. 8, an infrared ray emitting source IRS may be provided on a bottom surface of a first substrate 100. For example, the infrared ray emitting source IRS may be an object to be camouflaged. The colored electrochromic layer 410 may accommodate a first infrared ray IR1. The first infrared ray IR1 may be a sum of infrared rays emitted from the infrared ray emitting source IRS, the substrate 100, the reflective layer 210, the first electrode 220, and the electrolyte 500. The colored electrochromic layer 410 may absorb a portion of the first infrared ray IR1. Accordingly, the first infrared ray IR1 may pass through the colored electrochromic layer 410 and be converted into a second infrared ray IR2. That is, the second infrared ray IR2 may be the first infrared ray IR1 having a reduced intensity.

The detection unit 700 may measure a visible ray emitted from the surrounding environment of the active camouflage device 1 to transmit the measured value to the control unit 600. The control unit 600 may adjust an amount of ions that are absorbed by the electrochromic layer 400 so that the active camouflage element 10 emits an infrared ray having an intensity similar to that of the infrared ray emitted from the surrounding of the active camouflage device 1.

According to an embodiment of the inventive concept, the active camouflage device 1 capable of actively changing a wavelength of the visible ray emitted in correspondence to the visible ray emitted from the surrounding environment.

Figure 9:
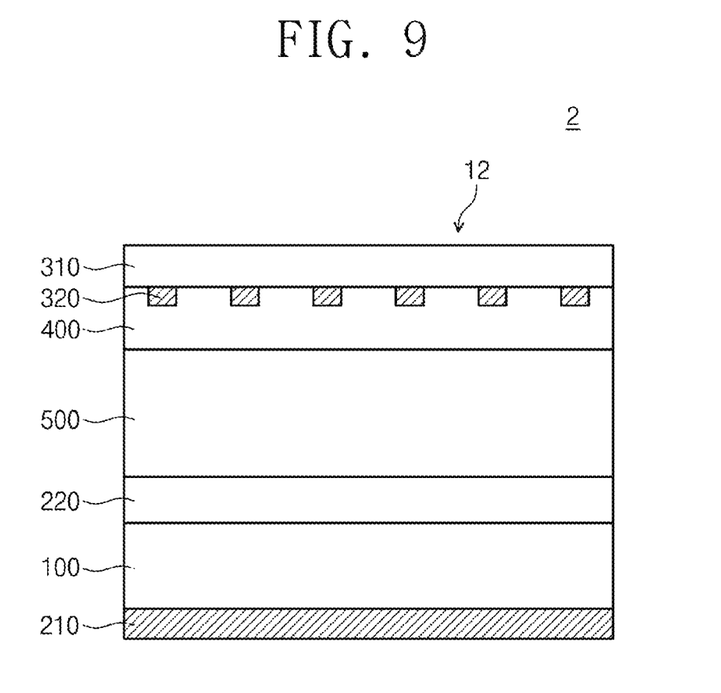
FIG. 9 is a cross-sectional view of an active camouflage device according to exemplary embodiments of the inventive concept.

FIG. 9 is a cross-sectional view of an active camouflage device according to exemplary embodiments of the inventive concept. For concise description, the substantially same contents as those described with reference to FIGS. 1 to 8 will not be described.

Referring to FIG. 9, an active camouflage element 12 including an active camouflage element 12, a control unit 600, and a detection unit 700 may be provided. The active camouflage element 12 may include a first substrate 100, a reflective layer 210, a first electrode 220, a second substrate 310, a second electrode 320, an electrochromic layer 400, and an electrolyte 500 provided between the electrochromic layer 400 and the first electrode.

The first substrate 100, the first electrode 220, the second substrate 310, the second electrode 320, the electrochromic layer 400, the electrolyte 500, the control unit 600, and the detection unit 700 may be substantially the same as the first substrate 100, the first electrode 220, the second substrate 310, the second electrode 320, the electrochromic layer 400, the electrolyte 500, the control unit 600, and the detection unit 700, which are described with reference to FIGS. 1 and 2.

Unlike FIG. 1, the reflective layer 210 may be disposed at an opposite side of the first electrode 220 with the first substrate 100 therebetween. The reflective layer 210 may reflect a ray or an electric wave that is incident into the reflective layer 210. The reflective layer 210 may include metal. For example, the reflective layer 210 may include gold (Au), silver (Ag), platinum (Pt), aluminum (Al), or a combination thereof.

The active camouflage device 2 according to the embodiment may have the substantially same operation modes as those described with reference to FIGS. 3 to 8.

Figure 10:
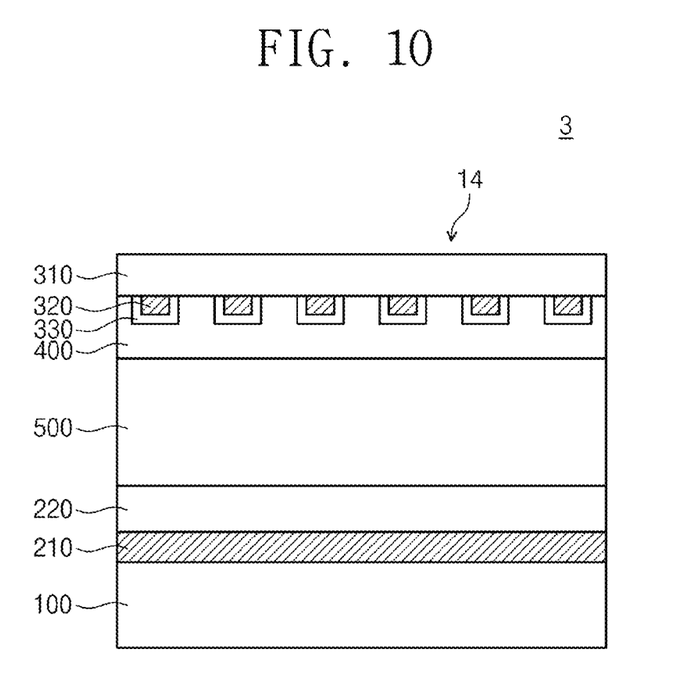
FIG. 10 is a cross-sectional view of an active camouflage device according to exemplary embodiments of the inventive concept.

FIG. 10 is a cross-sectional view of an active camouflage device according to exemplary embodiments of the inventive concept. For concise description, the substantially same contents as those described with reference to FIGS. 1 to 8 will not be described.

Referring to FIG. 10, an active camouflage device 3 including an active camouflage element 14, a control unit 600, and a detection unit 700 may be provided. The active camouflage element 14 may include a first substrate 100, a reflective layer 210, a first electrode 220, a second substrate 310, a second electrode 320, a passivation electrode 330, an electrochromic layer 400, and an electrolyte 500 provided between the electrochromic layer 400 and the first electrode 220.

The first substrate 100, the first electrode 220, the second substrate 310, the second electrode 320, the electrochromic layer 400, the electrolyte 500, the control unit 600, and the detection unit 700 may be substantially the same as the first substrate 100, the first electrode 220, the second substrate 310, the second electrode 320, the electrochromic layer 400, the electrolyte 500, the control unit 600, and the detection unit 700, which are described with reference to FIGS. 1 and 2.

The passivation electrode 330 may be disposed between the second electrode 320 and the electrochromic layer 400. The passivation electrode 330 may cover a surface of the second electrode 320. In general, when the electrolyte 500 passes through the electrochromic layer 400, the second electrode 320 may be damaged by contacting the electrolyte 500. The passivation electrode 330 may separate the second electrode 320 from the electrolyte 500 to prevent the second electrode 320 from being damaged. The passivation electrode 330 may be a transparent electrode. For example, the passivation electrode 330 may include an indium tin oxide (ITO) electrode, a fluorine doped tin oxide (FTO) electrode, an Al-doped ZnO (AZO) electrode, a carbon nano tube (CNT) electrode, a silver nanowire electrode, a ZnO—$Ga_2O_3$ electrode, a $ZnOAl_2O_3$ electrode, a tin oxide electrode, an antimony tin oxide (ATO) electrode, a zinc oxide electrode, and a combination thereof.

According to an embodiment of the inventive concept, an active camouflage device 3 preventing a second electrode 320 from being damaged may be provided.

Figure 11:
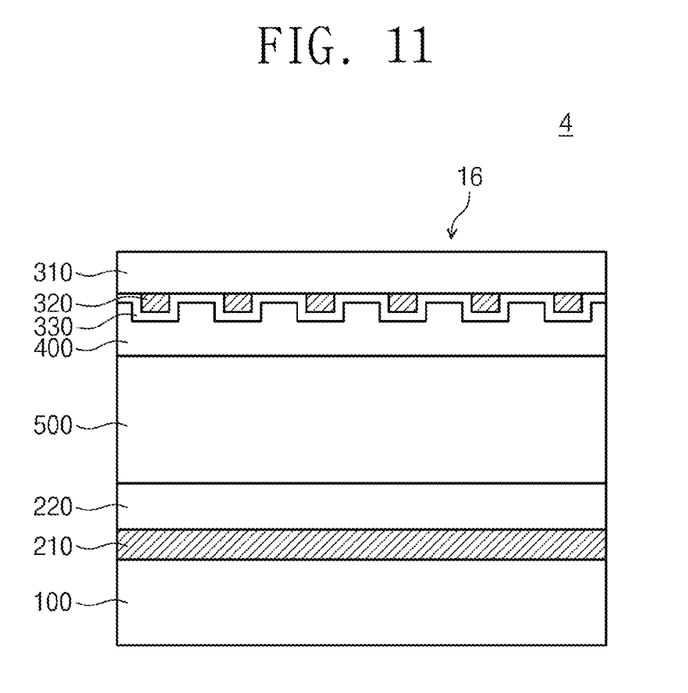
FIG. 11 is a cross-sectional view of an active camouflage device according to exemplary embodiments of the inventive concept.

FIG. 11 is a cross-sectional view of an active camouflage device according to exemplary embodiments of the inventive concept. For concise description, the substantially same contents as those described with reference to FIGS. 1 to 8 and 10 will not be described.

Referring to FIG. 11, an active camouflage device 4 including an active camouflage element 16, a control unit 600, and a detection unit 700 may be provided. The active camouflage element 16 may include a first substrate 100, a reflective layer 210, a first electrode 220, a second substrate 310, a second electrode 320, a passivation electrode 330, an electrochromic layer 400, and an electrolyte 500.

The first substrate 100, the first electrode 220, the second substrate 310, the second electrode 320, the electrochromic layer 400, the electrolyte 500, the control unit 600, and the detection unit 700 may be substantially the same as the first substrate 100, the first electrode 220, the second substrate 310, the second electrode 320, the electrochromic layer 400, the electrolyte 500, the control unit 600, and the detection unit 700, which are described with reference to FIGS. 1 and 2.

Unlike FIG. 10, the passivation electrode 330 may conformally cover a surface of each of the second electrodes 320 and a surface of the second substrate 310, which is exposed between the second electrodes 320. In general, when the electrolyte 500 passes through the electrochromic layer 400, the second substrate 310 and the second electrode 320 may be damaged by contacting the electrolyte 500. The passivation electrode 330 may separate the second substrate 310 and the second electrode 320 from the electrolyte 500 to prevent the second substrate 310 and the second electrode 320 from being damaged.

According to an embodiment of the inventive concept, an active camouflage device 4 preventing the second substrate 310 and the second electrode 320 from being damaged may be provided.

According to the embodiment of the inventive concept, the active camouflage device having the camouflage function with respect to a visible ray, an infrared ray, and an electric wave may be provided.

However, the effects of the embodiments of the inventive concept are not limited to the above description.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An active camouflage device comprising:
   a first substrate;
   a reflective layer on the first substrate;
   a first electrode disposed on the reflective layer;
   a second electrode facing the first electrode;
   an electrolyte provided between the first and second electrodes;
   an electrochromic layer between the second electrode and the electrolyte, the electrochromic layer configured to be colored when reduced and transparent when oxidized;
   a second substrate on the second electrode; and
   a passivation electrode between the electrochromic layer and the second electrode,
   the passivation electrode covering a side surface of the second electrode and being in contact with a lower surface of the second substrate to protect the second electrode from electrolyte diffused through the electrochromic layer,
   wherein the first electrode comprises a transparent electrode,
   wherein the second electrode comprises:
      a plurality of unit structures including a metamaterial; and
      a plurality of conductive lines connecting the unit structures, and
   wherein each unit structure of the plurality of unit structures is disposed at an intersection of the plurality of conductive lines,
   wherein the second electrode contains a metamaterial having a negative refractive index, and
   wherein a material of the plurality of conductive lines is different from a material of the plurality of unit structures.

2. The active camouflage device of claim 1, further comprising a semi-transparent layer provided between the first electrode and the electrolyte,
   wherein the semi-transparent layer contains gold (Au), silver (Ag), platinum (Pt), aluminum (Al), or a combination thereof.

3. The active camouflage device of claim 1, wherein the electrochromic layer contains tungsten trioxide ($WO_3$).

4. The active camouflage device of claim 1, wherein the passivation electrode directly contacts the electrolyte.

5. The active camouflage device of claim 1, wherein:
the first substrate is provided at an opposite side of the first electrode with the reflective layer therebetween, and
the second substrate is provided at an opposite side of the electrochromic layer with the second electrode therebetween, and
each of the first and second substrates comprises a transparent substrate.

6. The active camouflage device of claim 5, wherein each of the first and second substrates contains Si, Ge, $CaF_2$, or $BaF_2$.

7. The active camouflage device of claim 1, further comprising a first substrate provided between the reflective layer and the first electrode; and
a second substrate provided at an opposite side of the electrochromic layer with the second electrode therebetween,
wherein each of the first and second substrates comprises a transparent substrate.

8. The active camouflage device of claim 1, wherein the electrolyte contains at least one of silver (Ag) ions, bromine (Br) ions, lithium (Li) ions, and copper (Cu) ions.

9. The active camouflage device of claim 1, further comprising:
a control unit; and
a detection unit,
wherein the detection unit measures a wavelength of a visible ray and an intensity of an infrared ray of a surrounding of the active camouflage device to generate measurement data, and then sends the measurement data to the control unit, and
the control unit controls an operation mode of the active camouflage device on the basis of the measurement data received from the detection unit.

10. The active camouflage device of claim 9, wherein the operation mode of the active camouflage device comprises:
a visible ray camouflage mode in which the control unit applies a lower voltage to the first electrode than that applied to the second electrode to form a semi-transparent layer between the first electrode and the electrolyte.

11. The active camouflage device of claim 9,
the operation mode of the active camouflage device comprises:
an infrared ray camouflage mode in which the control unit applies a lower voltage to the second electrode than that applied to the first electrode to color the electrochromic layer.

12. The active camouflage device of claim 9, wherein the operation mode of the active camouflage device always comprises an electric wave camouflage mode at which an electric wave incident into the active camouflage device is absorbed.

13. The active camouflage device of claim 1, wherein the reflective layer is made of a different material than the first electrode.

* * * * *